(12) United States Patent
Mastrangelo et al.

(10) Patent No.: US 11,408,846 B2
(45) Date of Patent: Aug. 9, 2022

(54) LATERALLY ACTUATED AMPLIFIED CAPACITIVE VAPOR SENSOR

(71) Applicant: UNIVERSITY OF UTAH RESEARCH FOUNDATION, Salt Lake City, UT (US)

(72) Inventors: Carlos H. Mastrangelo, Salt Lake City, UT (US); Hanseup Kim, Salt Lake City, UT (US); Rugved Likhite, Salt Lake City, UT (US)

(73) Assignee: UNIVERSITY OF UTAH RESEARCH FOUNDATION, Salt Lake City, UT (US)

( * ) Notice: Subject to any disclaimer, the term of this patent is extended or adjusted under 35 U.S.C. 154(b) by 800 days.

(21) Appl. No.: 16/338,652

(22) PCT Filed: Oct. 30, 2017

(86) PCT No.: PCT/US2017/059088
§ 371 (c)(1),
(2) Date: Apr. 1, 2019

(87) PCT Pub. No.: WO2018/081735
PCT Pub. Date: May 3, 2018

(65) Prior Publication Data
US 2019/0227019 A1 Jul. 25, 2019

Related U.S. Application Data

(60) Provisional application No. 62/415,293, filed on Oct. 31, 2016.

(51) Int. Cl.
*G01N 27/22* (2006.01)
*H01G 5/16* (2006.01)
(Continued)

(52) U.S. Cl.
CPC .......... *G01N 27/225* (2013.01); *H01G 5/011* (2013.01); *H01G 5/16* (2013.01); *H01G 5/18* (2013.01)

(58) Field of Classification Search
CPC .. G01N 27/225; G01N 27/227; G01N 27/223; G01N 27/121; G01N 27/12;
(Continued)

(56) References Cited

U.S. PATENT DOCUMENTS 5,417,100 A 5/1995 Miller et al.
5,756,879 A 5/1998 Yamagishi et al.
(Continued)

OTHER PUBLICATIONS

Chatzandroulis et al. "Fabrication of single crystal Si cantilevers using a dry release process and application in a capacitive-type humidity sensor" Microelectronic Engineering, vols. 61-62, 2002, pp. 955-961, ISSN 0167-9317, Web. accessed Mar. 21, 2022 (Year: 2002).*

(Continued)

*Primary Examiner* — Nimeshkumar D Patel
*Assistant Examiner* — Jean F Morello
(74) *Attorney, Agent, or Firm* — Michael Best & Friedrich LLP (57) ABSTRACT

A capacitive vapor sensor, sensor system, and method for determining a vapor concentration is provided. The capacitive sensor includes a first electrode and a second electrode. The first and second electrodes are configured to provide a bias voltage. The sensor further includes a cantilevered sensor electrode interdigitated between the first and second electrodes and having an adsorptive polymer attached to a surface of the cantilevered sensor electrode. The adsorptive polymer is configured to expand in response to adsorbing a vapor and cause a deflection of the cantilevered sensor electrode, the deflection causing a change in a differential capacitance of the first and second electrodes. A sensor (Continued)

indicates current at the cantilevered sensor electrode, and an electronic processor determines the change in the differential capacitance to determine a characteristic or concentration of the vapor.

20 Claims, 9 Drawing Sheets

(51) Int. Cl.
   H01G 5/011 (2006.01)
   H01G 5/18 (2006.01)
(58) Field of Classification Search
   CPC . H01G 5/011; H01G 5/16; H01G 5/18; H01G 11/26
   USPC ...................................................... 73/332.04
   See application file for complete search history.

(56) References Cited

U.S. PATENT DOCUMENTS

| | | |
|---|---|---|
| 7,086,288 B2 | 8/2006 | Lee et al. |
| 8,832,411 B2 | 9/2014 | Iyigun et al. |
| 2005/0121615 A1 | 6/2005 | Parter et al. |
| 2005/0161749 A1 | 7/2005 | Yang et al. |
| 2006/0257286 A1 | 11/2006 | Adams |
| 2007/0145966 A1 | 6/2007 | Shekhawat et al. |
| 2015/0123745 A1 | 5/2015 | Arcamone et al. |
| 2015/0177196 A1 | 6/2015 | Sussner et al. |

OTHER PUBLICATIONS

Pareek et al., "Stability limits of torque gain in angular electrostatic actuators," in Eurosensors XVII, Guimeres, Portugal, 2003, pp. 36-37.
Albert et al., "Cross reactive chemical sensor arrays," Chem. Rev., 2000, 100: 2595-626.
Ansbæk et al., "Vertical-cavity surface-emitting laser vapor sensor using swelling polymer reflection modulation," Applied Physics Letters, 2012, 101, 143505.
Arshak et al., "A review of gas sensors employed in electronic nose applications," Sensor Review, 2004, 24(2): 181-198.
Baller et al., "A cantilever array-based artificial nose," Ultramicroscopy, 2000, 82: 1-9.
Barsan et al., "Fundamental and Practical Aspects in the Design of Nanoscaled SnO2 Gas Sensors: a Status Report," Fresenius J. Anal. Chem., 1999, 365: 287-304.
Barsan et al., "Metal Oxide-Based Gas Sensor Research: How to?," Sens. Actuat. B, 2007, 121: 18-35.
Baselt et al., "Design and performance of a microcantilever-based hydrogen sensor," Sens. Actuators B, Chem., 2003, 88(2): 120-131.
Battiston et al., "A chemical sensor based on a microfabricated cantilever array with simultaneous resonance-frequency and bending readout," Sensors and Actuators B, 2001, 77: 122-131.
Batzill et al., "The Surface and Materials Science of Tin Oxide," Prog. Surf. Sci., 2005, 79: 47-154.
Batzill, "Surface Science Studies of Gas Sensing Materials: SnO2," Sensors, 2006, 6: 1345-1366.
Berger et al., "Gimzewski Micromechanics: A Toolbox for Femtoscale Science: Towards a Laboratory on a Tip," Microelectronics Engineering, 1997, 35: 373-379.
Betts et al., "Selectivity of chemical sensors based on microcantilevers coated with thin polymer films," Anal. Chim. Acta, 2000, 422: 89-99.
Briglin et al., "Exploitation of spatiotemporal information and geometric optimization of signal/noise performance using arrays of carbon black-polymer composite vapor detectors," Sensors and Actuators B: Chemical, 2002, 82(1): 54-74.
Britton et al., "Multiple-input microcantilever sensors," Ultramicroscopy, 2000, 82: 17-21.

Cai et al., "Vapor recognition with an integrated array of polymer-coated flexural-platewave sensors," Sens. Actuators B, Chem., 2000, 62: 121-130.
Chen et al., "Novel vapor sensor from polymer-grafted carbon black: effects of heat-treatment and gamma ray radiation-treatment on the response of sensor material in cyclohexane vapor," Polymer, 2002, 43(8): 2201-6.
Comini et al., "Quasi-One Dimensional Metal Oxide Semiconductors: Preparation, Characterization and Application as Chemical Sensors," Prog. Mater. Sci., 2009, 54: 1-67.
Corcoran, "Electronic odor sensing systems," Electronics and Communication Engineering Journal, 1993, 5(5): 303-8.
Datskos et al., "Chemical detection based on adsorption-induced and photoinduced stresses in microelectromechanical systems devices," Journal of Vacuum Science & Technology B, 2001, 19: 1173.
Degani et al., "Design considerations of rectangular electrostatic torsion actuation based on new analytical pull-in expression," J. Microelectromech. Syst., 2002, 11: 20-26.
Degani et al., "Pull-in study of an electrostatic torsion micromirror," J. Microelectromech. Syst., 1998 7: 373-379.
Delapierre et al., "Polymer based capacitive humidity sensor: characteristics and experimental results," Sen. Actuators B, Chem., 1983, 4: 97-104.
Denton et al., "Fundamental Issues in the Design of Polymeric Capacitive Moisture Sensors," Digest of technical papers, 3rd International conference on solid-state sensors and actuators, (Transducers'85), Philadelphia, PA, USA, 1985, pp. 202-205.
Dokmeci et al., "Two-axis single-crystal silicon micromirror arrays," Journal of Microelectromechanical Systems, 2004, 13(6): 1006-1017.
Doleman et al., "Quantitative study of the resolving power of arrays of carbon black-polymer composites in various vapor-sensing tasks," Analytical Chemistry, 1998, 70(19): 4177-90.
Doleman et al., "Use of compatible polymer blends to fabricate arrays of carbon black-polymer composite vapor detectors," Analytical chemistry, 1998, 70: 2560-4.
Dong et al., "Characterization of the gas sensors based on polymer-coated resonant microcantilever for the detection of volatile organic compounds," Analyt. Chimica Acta, 2010, 671: 85-91.
Eastman et al., "Application of the solubility parameter concept to the design of chemiresistor arrays," J. Electrochem. Soc., 1999, 146: 3907-3913.
Endres et al., "A capacitive CO2 sensor system with suppression of the humidity interference," Sens. Actuators B, Chem., 1999, 57: 83-87.
Eranna et al., "Oxide Materials for Development of Integrated Gas Sensors—A Comprehensive Review," Crit. Rev. Solid State Mater. Sci., 2004, 29: 111-188.
Fadel et al., "Chemical sensing: Millimeter size resonant microcantilever performance," J Micromech Microeng., 2004, 14: S23-S30.
Fang et al., "Micro-gas-sensor with conducting polymers," Sensors and Actuators B: Chemical, 2002, (84)1: 66-71.
Fenner et al., "A micromachined water vapor sensor for home appliances," Sensors, 2002, 19(5): 32-40.
Fergus, "Perovskite Oxides for Semiconductor-Based Gas Sensors," Sens. Actuat. B, 2007, 123: 1169-1179.
Fotis, "A new ammonia detector based on thin film polymer technology," Sensors, 2002, 19(5): 73-75.
Freund et al., "A chemically diverse conducting polymer based electronic nose," Proc. Natl. Acad. Sci. USA, 1995, 92: 2652-6.
Glenn et al., "An IC Compatible Polymer Humidity Sensor," Digest of technical papers, 3rd International conference on solid-state sensors and actuators, (Transducers'85), Philadelphia, PA, USA, 1985, pp. 217-220.
Grate et al., "Comparisons of polymer/gas partition coefficients calculated from responses of thickness shear mode and surface acoustic wave vapor sensors," Anal. Chem., 1998, 70: 199-203.
Grate et al., "Method for unknown vapor characterization and classification using a multivariate sorption detector: initial derivation and modeling based on polymer-coated acoustic wave sensor arrays and linear solvation energy relationships," Anal. Chem., 1999, 71: 4544-4553.

(56) References Cited

OTHER PUBLICATIONS

Hah et al., "A low-voltage actuated micromachined microwave switch using torsion springs and leverage," IEEE Transactions on Microwave Theory and Techniques, 2000, 48(12): 2540-2545.
Hah et al., "Design of electrostatic actuators for MOEMS applications," Proceedings SPIE 4755, Design, Test, Integration, and Packaging of MEMS/MOEMS 2002.
Hah et al., "Low-voltage, large-scan angle MEMS analog micromirror arrays with hidden vertical comb-drive actuators," JMEMS, 2004, 13(2): 279-289.
Haiss, "Surface stress ofclean and adsorbate-covered solids," Rep. Prog. Phys., 2001, 64: 591-648.
Hancock, "Development of SRM 2907 trace terrorist explosives simulants for the detection of semtexand triacetone triperoxide," Analytical Chemistry, 2011, 83(23): 9054-59.
Henri et al., "Fabrication, simulation and experiment of a rotating electrostatic silicon mirror with large angular deflection," 13th Annual International Conference on Micro Electro Mechanical Systems, MEMS2000, Japan, 2000, pp. 645-650.
Hierlemann et al., "Application-specific sensor systems based on CMOS chemical microsensors," Sens Act B, 2000, 70: 2-11.
Hornbeck, "Digital Light Processing and MEMS: Timely Convergence for a Bright Future," (Invited Plenary Paper), Proceedings SPIE, 1995, vol. 2639, p. 2. Micromachining and Microfabrication Process Technology.
Hornbeck, "Deformable-mirror spatial light modulators," Proceedings SPIE, 1990, Spatial Light Modulators and Applications III, 1150: 86-102.
Hu et al., "Investigation of adsorption and absorption-induced stresses using microcantilever sensors," J. Appl. Phys., 2001, 90: 427.
Huang et al., "A modeling and analysis of spring-shaped torsion micromirrors for low-voltage applications," International Journal of Mechanical Sciences, 2006, 48: 650-661.
Hughes et al., "Integrated chemiresistor array for small sensor platforms," SPIE Proceedings of the Detection and Remediation Technologies for Mines and Minelike Targets V, AeroSense 2000, 4038: 519-529.
International Search Report and Written Opinion for Application No. PCT/US2017/059088 dated Jan. 29, 2018 (11 pages).
Jaecklin et al., "Line-addressable torsional micromirror for light modulator arrays," Sens. Actuators A, 1994, 41: 324-329.
Jensenius et al., "A microcantilever-based alcohol vapor sensor-application and response model," Appl. Phys. Lett., 2000, 76: 2615-2617.
Ji et al., "A novel self-assembled monolayer (SAM) coated microcantilever for low level cesium detection," Chem. Commun., 2000, 6: 457-458.
Kim et al., "Multicomponent analysis and prediction with a cantilever array based gas sensor," Sens. Actuators B, Chem., 2001, 78: 12-18.
Korotcenkov, "Gas Response Control through Structural and Chemical Modification of Metal Oxide Films: State of the Art and Approaches," Sens. Actuat. B, 2005, 107: 209-232.
Korotcenkov, "Metal Oxides for Solid-State Gas Sensors: What Determines Our Choice?," Mater. Sci. Eng. B, 2007, 139: 1-23.
Korotcenkov, "The Role of Morphology and Crystallographic Structure of Metal Oxides in Response of Conductometric-Type Gas Sensors," Mater. Sci. Eng. R, 2008, 61: 1-39.
Krylov et al., "Bouncing mode electrostatically actuated scanning micromirror for video applications," Smart Mater. Struct., 2005, 14: 1281.
Lang et al., "An artificial nose based on a micromechanical cantilever array," Analytica Chimica Acta, 1999, 393: 59-65.
Lang et al., "An Artificial Nose Based on Microcantilever Array Sensors," Journal of Physics: Conference Series, 2007, 61: 663-667.
Lang et al., "Cantilever array sensors," Materials Today, 2005, 8(4): 30-36.
Lange et al., "Complementary metal oxide semiconductor cantilever arrays on a single chip: Mass-sensitive detection of volatile organic compounds," Anal Chem., 2002, 74: 3084-3095.
Lee et al., "Temperature modulation in semiconductor gas sensing," Sensors Actuators B, 1999, 60: 35-42.
Lee, "Gas Sensors Using Hierarchical and Hollow Oxide Nanostructures: Overview," Sens. Actuat. B, 2009, 140: 319-336.
Li, "The cyranose chemical vapor analyzer," Sensors, 2000, pp. 56-60.
Likhite et al., "Amplified Chemo-Mechanical Comb Gas Sensors," IEEE Sensors 2016 conference held at Orlando from Oct. 30, 2016 to Nov. 2, 2016 (3 pages).
Likhite et al., "Amplified Chemo-Mechanical Comb Gas Sensors," PowerPoint presentation, IEEE Sensors 2016 conference held at Orlando from Oct. 30, 2016 to Nov. 2, 2016.
Lonergan et al., "Array-based vapor sensing using chemically sensitive carbon black-polymer resistors," Chem. Mater., 1996, 8: 2298-2312.
Lu et al., "Quasi-One-Dimensional Metal Oxide Materials-Synthesis, Properties and Applications," Mater. Sci. Eng. R, 2006, 52: 49-91.
Matzger et al., "Combinatorial Approaches to the Synthesis of Vapor Detector Arrays for Use in an Electronic Nose," J. Comb. Chem., 2000, 2: 301-304.
Maute et al., "Detection of volatile organic compounds (VOCs) with polymer-coated cantilevers," Sens. Actuators B, Chem., 1999, 58: 505-511.
McGill et al., "Choosing polymer coatings for chemical sensors," Chem. Tech., 1994, 24(9): 27-37.
Misiakos, "A onolithic photonic microcantilever device for in situ monitoring of volative compounds," Lab on a Chip, 2009, 9: 1261-1266.
Mönch et al., "Swelling of polymer Bragg mirrors," Applied Physics Letters, 2006, 89, 164104.
Moos et al., "Solid State Gas Sensor Research in Germany—a Status Report," Sensors, 2009, 9: 4323-4365.
Munoz et al., "Conductive polymer-carbon black composites-based sensor arrays for use in an electronic nose," Sensor Review, 1999, 19(4): 300-5.
Nagle et al., "The how and why of electronic noses," IEEE Spectrum, 1998, 35: 22-34.
Nemirovsky et al., "A methodology and model for the pull-in parameters of electrostatic actuators," Journal of Microelectromechanical Systems, 2001, 10(4): 601-615.
Orton et al., "The Hall Effect in Polycrystalline and Powdered Semiconductors," Rep. Prog. Phys., 1980, 43: 1263-1307.
Osbourn et al., "Visual empiricalregion-of-influence pattern recognition applied to chemical microsensor array selection and chemical analysis," Accid. Chem. Res., 1998, 31: 297-305.
Pan et al., "Design, modeling and verification of MEMS silicon torsion mirror," SPIE 3226, 1997, pp. 114-124.
Park et al., "Ceramics for Chemical Sensing," J. Mater. Sci., 2003, 38: 4611-4637.
Partridge et al., "Conducting polymer-based sensors," Materials Science and Engineering: C, 2000, 12(1-2): 37-42.
Patel et al., "Chemicapacitive microsensors for volatile organic compound detection," Sensors and Actuators B: Chemical, 2003, 96: 541-553.
Pinnaduwage et al., "Detection of 2,4-dinitrotoluene using microcantilever sensors," Sens. Actuators B: Chemical, 2004, 99(2-3): 223-229.
Pinnaduwage et al., "Moore's law in homeland defense: An integrated sensor platform based on silicon microcantilevers," IEEE Sens J., 2005, 5: 774-785.
Pinnaduwage et al., "Sensitive detection of plastic explosives with self-assembled monolayer-coated microcantilevers," Appl Phys Lett, 2003, 83: 1471-1473.
Plötz et al., "A low-voltage torsional actuator for application in RF-microswitches," Sensors and Actuators A: Physical, 2001, vol. 92(1-3): 312-317.
Porter et al., "Sensor based on piezoresistive microcantilever technology," Sens. Actuators A, Phys., 2001, 88: 47-51.

(56) References Cited

OTHER PUBLICATIONS

Qazi et al., "Asymmetrical twin cantilevers for single molecule detection," Appl. Phys. Lett., 2007, 90: 173118.
Rothschild et al., "On the Relationship between the Grain Size and Gas-Sensitivity of Chemo-Resistive Metal-Oxide Gas Sensors with Nanosized Grains," J. Electroceram., 2004, 13: 697-701.
Rothschild et al., "The Effect of Grain Size on the Sensitivity of Nanocrystalline Metal-Oxide Gas Sensors," J. Appl. Phys., 2004, 95: 6374-6380.
Rumyantseva et al., "Chemical Modification of Nanocrystalline Metal Oxides: Effect of the Real Structure and Surface Chemistry on the Sensor Properties," Russ. Chem. Bull., 2008, 57: 1106-1125.
Sakurai et al., "Novel array-type gas sensors using conducting polymers, and their performance for gas identification," Sensors and Actuators B: Chemical, 2002, (83)1-3: 270-5.
Sattler et al., "Modeling of an electrostatic torsional actuator: demonstrated with an RF MEMS switch," Sensors and Actuators A: Physical, 2002, 97-98: 337-346.
Sberveglieri et al., "Silicon hotplates for metal oxide gas sensor elements," Microsyst. Technol., 1997, 3(4): 183-90.
Schaller et al., "Electronic noses and their application to food," Lebensmittel-Wissenschaft und-Technologie, 1998, 31(4): 305-316.
Semanic et al, "Microhotplate platforms for chemical sensor research," Sensors Actuat. B, 2001, 77: 579-591.
Seo et al., "A bulk-micromachined silicon micromirror fortunable optical switch applications," in Proc. IEEE Conf. on Emerging Technologies and Factory Automation, 1996, 2: 404-407.
Severin et al., "Differential detection of enantiomeric gaseous analytes using carbon black-chiral polymer composite, chemically sensitive resistors," Analytical chemistry, 1998, 70: 1440-3.
Shibata et al., "A digital hygrometer using a polyimide film relative humidity sensor," IEEE Trans. Inst. Meas., 1996, 45(2): 564-569.
Shurmer et al., "Odour discrimination with an electronic nose," Sensors and Actuators B, 1992, 8: 1-11.
Simon et al., "Micromachined metal oxide gas sensors: opportunities to improve sensor performance," Sensors Actuators B, 2001, 73: 1-26.
Sotzing et al., "Highly sensitive detective and discrimination of biogenic amines ulitizing arrays of polyanaline/carbon black composite vapor detectors," Chem. Mater., 2000, 12: 593-5.
St-Gelais, "Gas sensing using polymer-functionalized deformable Fabry-Perot interferometers," Sensors and Actuators B 182 (2013) 45-52.
Stoney, "The tension of metallic films deposited by electrolysis," Proc. Royal Soc. London, 1909, A82: 172-177.
Tagizadeh et al., "Bifurcation analysis of torsional micromirror actuated by electrostatic forces," Arch. Mech., 2014, 66(2): 95-111.
Then et al., "A highly sensitive self-oscillating cantilever array for the quantitative and qualitative analysis of organic vapor mixtures," Sens Act B, 2006, 117: 1-9.
Tiemann, "Porous Metal Oxides as Gas Sensors," Chem. Eur. J., 2007, 13: 8376-8388.
Tsuchitani et al., "Humidity Sensor Using Ionic Copolymer," Digest of technical papers, 3rd International conference on solid-state sensors and actuators, (Transducers'85), Philadelphia, PA, USA, 1985, pp. 210-212.
van Kessel et al., "A MEMS-based projection display," Proceedings of the IEEE, 1998, 86(8): 1687-1704.
Vancura et al., "Magnetically actuated complementary metal oxide semiconductor resonant cantilever gas sensor systems," Anal Chem., 2005, 77: 2690-2699.
Wang et al., "Metal Oxide Gas Sensors: Sensitivity and Influencing Factors," Sensors, 2010, 10: 2088-2106.
Xu et al., "Development of a Reliable Micro-Hotplate With Low Power Consumption," in Sensors Journal, IEEE, 2011, 11(4): 913-919.
Yamazoe et al., "New Perspectives of Gas Sensor Technology," Sens. Actuat. B, 2009, 138: 100-107.
Zee et al., "Micromachined polymer-based chemical gas sensor array," Sensors and Actuators B: Chemical, 2001, 72(2): 120-8.
Zellers et al., "Effects of temperature and humidity on the performance of polymer-coated surface acoustic wave vapor sensor arrays," Anal. Chem., 1996, 68: 2409-2418.
Zhang et al., "A study of the static characteristics of a torsional micromirror," Sens. Actuators A, 2001, 90: 73-81.
Zhang et al., "Residual stress in spin-cast polyurethane thin films," Appl. Phys. Lett., 2015, 106: 033102.
Zhu et al., "Modelling and control of an electrostatically actuated torsional micromirror," J. Micromech. Microeng., 2006, 16: 2044-2052.

\* cited by examiner

LATERALLY ACTUATED AMPLIFIED CAPACITIVE VAPOR SENSOR

CROSS-REFERENCE TO RELATED APPLICATION(S)

This application is a U.S. national stage entry of International Application No. PCT/US2017/059088, filed Oct. 30, 2017, titled "Laterally Actuated Amplified Capacitive Vapor Sensor," which claims benefit of priority to U.S. Provisional Application No. 62/415,293, filed Oct. 31, 2016, titled "Laterally Actuated Amplified Capacitive Vapor Sensor," the contents of which are hereby incorporated by reference in their entirety and for all purposes.

FIELD

Embodiments described herein relate to a capacitive vapor sensor that detects a presence of a vapor.

SUMMARY

Detection of vapors in the atmosphere may be difficult, particularly for odorless or colorless vapors. Some embodiments are provided herein for a capacitive vapor sensor that detects a presence or concentration of a vapor.

In one embodiment, a capacitive vapor sensor is provided including a first electrode and a second electrode. The first and second electrodes are configured to provide a bias voltage. The sensor further includes a cantilevered sensor electrode interdigitated between the first and second electrodes and having an adsorptive polymer attached to a surface of the cantilevered sensor electrode. The adsorptive polymer is configured to expand in response to adsorbing a vapor and cause a deflection of the cantilevered sensor electrode, the deflection causing a change in a differential capacitance of the first and second electrodes.

In another embodiment, a method is provided for determining a vapor concentration. The method includes supplying a bias voltage to a first electrode and a second electrode. The method further includes deflecting, by a cantilevered sensor electrode, in response to an adsorption of a vapor by an adsorptive polymer attached to a surface of the cantilevered sensor electrode. The adsorptive polymer is configured to expand in response to the adsorbing of the vapor, and the deflection causes a change in a differential capacitance of the first and second electrodes. The method also includes sensing a current at the cantilevered sensor electrode. An electronic processor determines the change in the differential capacitance based on the current sensed, and outputs a vapor concentration of the vapor based on the change in the differential capacitance.

In another embodiment, a capacitive vapor sensor system is provided. The system includes a capacitive vapor sensor, a sensor, and an electronic processor. The capacitive vapor sensor includes a first electrode and a second electrode, the first and second electrodes configured to provide a bias voltage, and a cantilevered sensor electrode interdigitated between the first and second electrodes. An adsorptive polymer is attached to a surface of the cantilevered sensor electrode and is configured to expand in response to adsorbing a vapor and cause a deflection of the cantilevered sensor electrode. The deflection causes a change in a differential capacitance of the first and second electrodes. The sensor is coupled to the cantilevered sensor electrode and is configured to indicate current at the cantilevered sensor electrode. The electronic processor is coupled to the sensor and is configured to determine the change in the differential capacitance to determine a characteristic of the vapor.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
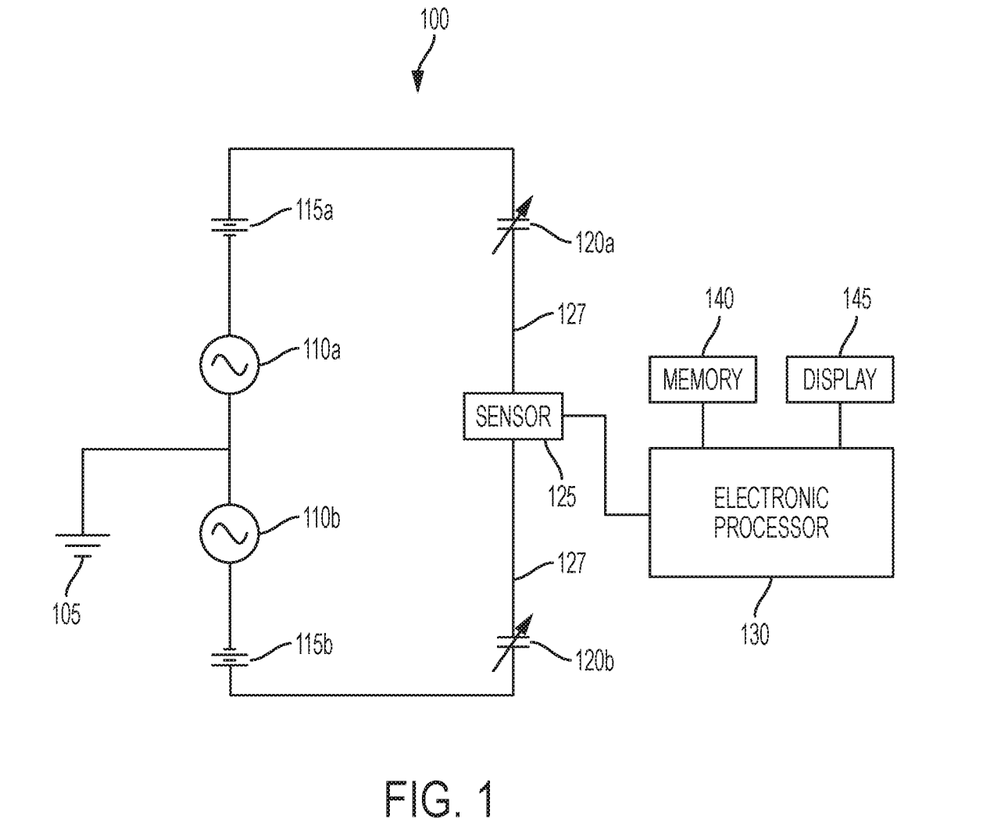
FIG. 1 illustrates a circuit diagram for a capacitive vapor sensor system according to one embodiment.

FIG. 1 schematically illustrates a circuit diagram for a capacitive vapor sensor system 100 according to one embodiment. The capacitive vapor sensor system 100 includes a ground connection 105, a first alternating current (AC) voltage source 110a, a second AC voltage source 110b, a first direct current (DC) voltage source 115a, a second DC voltage source 115b, a first capacitor 120a, a second capacitor 120b, and a sensor 125. The sensor 125 is positioned to detect current at a shared node 127 between the first and second capacitors 120a-b.

The capacitive vapor sensor system 100 further includes an electronic processor 130 (e.g., a microprocessor) coupled to a memory 140 and a display 145. The memory 140 may include read only memory (ROM), random access memory (RAM), other non-transitory computer-readable media, or a combination thereof. The electronic processor 130 is configured to receive instructions and data from the memory 140 and execute, among other things, the instructions. In particular, the electronic processor 130 executes instructions stored in the memory 140 to perform the methods described herein and the functionality of the electronic processor 130 described herein. The display 145 is, for example, a touch screen display, and is configured to receive user input and provide user output.

The ground connection 105 provides a ground for the circuit. The first and second AC voltage sources 110a-b, in one embodiment, are configured to provide a small AC voltage signal (e.g., 50 or 100 millivolts at 1 kilohertz to 1 megahertz) to the first and second capacitors 120a-b, respectively. The first and second DC voltage sources 115a-b are configured to provide a DC bias voltage to the first and second capacitors 120a-b, respectively. The first and second capacitors 120a-b are variable capacitors, as explained in further detail below.

The sensor 125 is configured to detect current at the shared node 127 between the first and second capacitors 120a-b. Current at the shared node 127 is induced by the first and second AC voltage sources 110a-b. The amount of current detected by the sensor 125 at the shared node 127 is the result of the difference in capacitance between the first and second capacitors 120a-b. The electronic processor 130 receives a signal from the sensor 125 indicative of the sensed current at the shared node 127, which is representative of the difference in capacitance between the first and second capacitors 120a-b.

Figure 3:
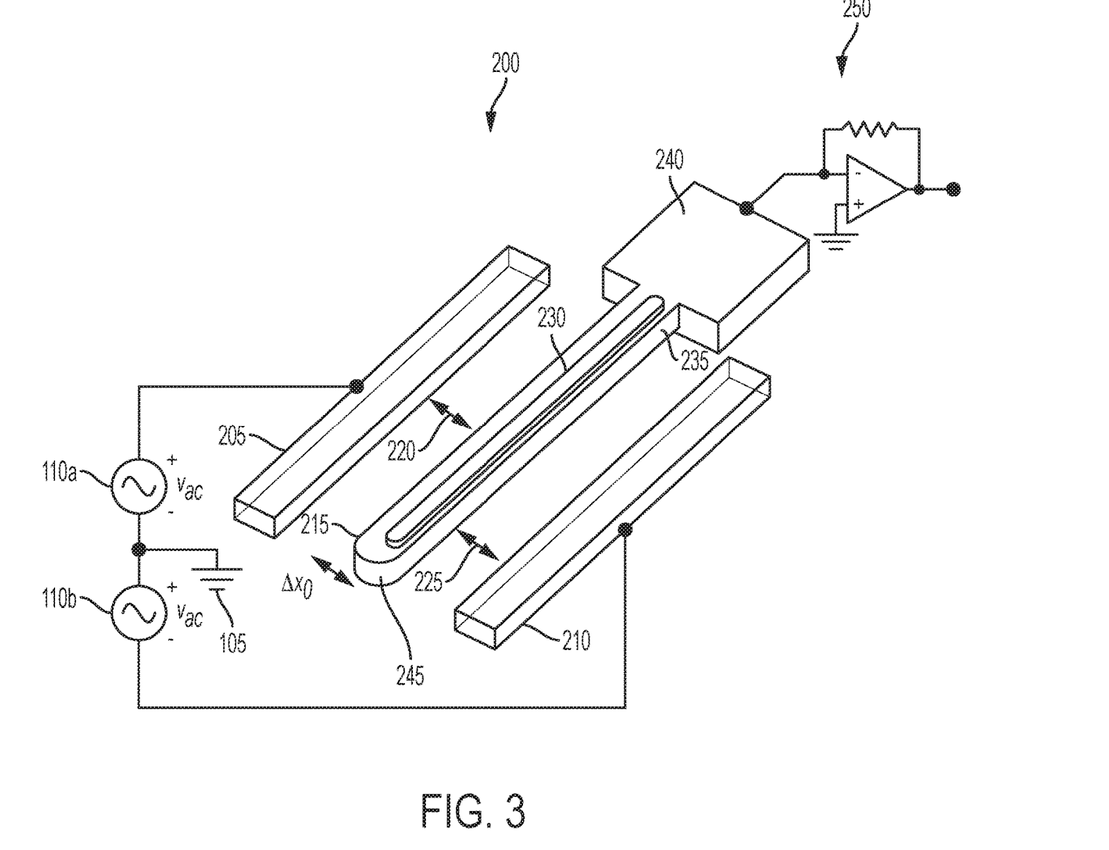
FIG. 3 illustrates a deflection of a cantilevered sensor electrode of the capacitive vapor sensor.

In some embodiments, the sensor 125 includes a current-to-voltage convertor operational amplifier (see, for example, operational amplifier 250, FIG. 3). The sensor 125 converts the AC current at the shared node 127 to a voltage, which is output from the sensor 125. The voltage output from the sensor 125 is then sent to the electronic processor 130, where the voltage is indicative of a difference in capacitance between the first and second capacitors 120a-b.

In some embodiments, the instantaneous voltage output by the sensor 125, which indicates the instantaneous current of at the shared node 127, is used as an indication of the difference in capacitance between the first and second capacitors 120a-b. For example, the voltage output amplitude of the operational amplifier is proportional to the difference in capacitance between the first and second capacitors 120a-b. In other embodiments, the electronic processor 130 is configured to receive and average over time the voltage output by the sensor 125. The average voltage indicates the average current at the shared node 127, and is used as the indication of the difference in capacitance between the first and second capacitors 120a-b. The average assists in reducing the effects of noise on the instantaneous AC current or voltage.

In some embodiments, the electronic processor 130 is electrically coupled to the first and second AC voltage sources 110a-b and the first and second DC voltage sources 115a-b. The electronic processor 130 is configured to control the amount of AC voltage produced by the first and second AC voltage sources 110a-b and the amount of DC voltage produced by the first and second DC voltage sources 115a-b by sending control signals to the first and second AC voltage sources 110a-b and the first and second DC voltage sources 115a-b to produce a determined level of AC voltage and DC voltage, respectively. For example, the electronic processor 130 may generate a control signal for the first and second AC voltage sources 110a-b to produce a 50 millivolt AC voltage and may further generate a control signal for the first and second DC voltage sources 115a-b to produce a 5 volt DC voltage. To simplify the diagram of FIG. 1, the particular connections between the electronic processor 130 and the voltage sources are not illustrated.

In further embodiments, the electronic processor 130 may be configured to generate control signals for the first AC voltage source 110a and the second AC voltage source 110b to control the amounts of AC voltage being output. The electronic processor 130 may also generate control signals for the first DC voltage source 115a and the second DC voltage source 115b to control the amount of DC voltage being output.

Figure 2:
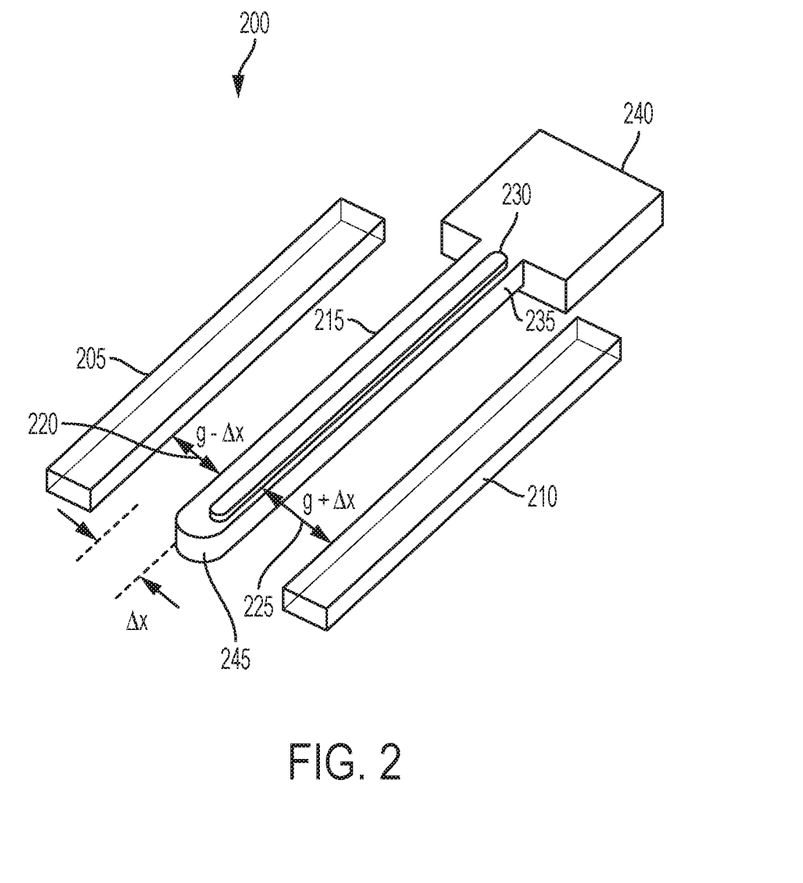
FIG. 2 illustrates a capacitive vapor sensor of the capacitive vapor sensor system of FIG. 1.

FIG. 2 illustrates a capacitive vapor sensor 200 used in the capacitive vapor sensor system 100, according to some embodiments. The capacitive vapor sensor 200, which may also be referred to as a laterally actuated amplified capacitive vapor sensor, includes a first electrode 205, a second electrode 210, and a cantilevered sensor electrode 215 interdigitated between the first electrode 205 and the second electrode 210. The first electrode 205 and the cantilevered sensor electrode 215 are separated by a gap 220. The second electrode 210 and the cantilevered sensor electrode 215 are separated by a gap 225. A nonconducting dielectric medium, such as air, is located in the gaps 220 and 225. With reference to FIG. 1, the first electrode 205 and the cantilevered sensor electrode 215, along with the nonconducting dielectric medium within the gap 220, form the first capacitor 120a. Similarly, the second electrode 210 and the cantilevered sensor electrode 215, along with the nonconducting dielectric medium within the gap 225, form the second capacitor 120b.

The first electrode 205 and the second electrode 210 each are provided a bias voltage from the first and second DC voltage sources 115a-b, respectively. In some embodiments, the bias voltage is symmetric (i.e., approximately equal and opposite polarity) for the first electrode 205 and second electrode 210. For example, in one embodiment, the first electrode 205 is provided positive five volts as a bias voltage and the second electrode 210 is provided negative five volts as a bias voltage. The first electrode 205 and the second electrode 210 further receive an AC voltage from the first and second AC voltage sources 110a-b. In some embodiments, the AC voltage generated by the first and second AC voltage sources 110a-b is the same (i.e., approximately equal amplitude, frequency, and phase) for the first electrode 205 and second electrode 210. In some embodiments, approximately equal refers to being within 5 or 10 percent of the desired value.

The cantilevered sensor electrode 215 includes an adsorptive polymer 230 attached to a surface of the cantilevered sensor electrode 215 asymmetrically. For example, in some embodiments, the adsorptive polymer 230 is attached to a top surface of the cantilevered sensor electrode 215. In other embodiments, the adsorptive polymer 230 is attached to a side surface of the cantilevered sensor electrode 215 or to multiple surfaces of the cantilevered sensor electrode 215.

The first electrode 205, the second electrode 210, and the cantilevered sensor electrode 215 are elongated members having an elongated shape that extends along a longitudinal axis of each. The cantilevered sensor electrode 215 has a fixed end 235 coupled to a conductive base 240, and has a deflecting end 245 that is a free end opposite the fixed end 235. The cantilevered sensor electrode 215 is considered interdigitated between the first electrode 205 and the second electrode 210 because the deflecting end 245 extends into the lateral area between the two electrodes 205, 210. The amount that the deflecting end 245 extends into the lateral area between the two electrodes 205, 210, is the lateral overlap length (see lateral overlap length 247 in FIG. 9). The lateral overlap length multiplied by height of the electrodes is the lateral overlap area. The longitudinal axis of each of the first electrode 205, the second electrode 210, and the cantilevered sensor electrode 215 are generally parallel to each other when the capacitive vapor sensor 200 is in an initial state. However, the cantilevered sensor electrode 215 has a spring constant (k) and is flexible in accordance with the spring constant (k) such that the deflecting end 245 deflects laterally, as described in further detail below. In some embodiments, lateral deflection includes movement substantially perpendicular to the pull of gravity, such as movement within 5 or 10 degrees of perpendicular.

The adsorptive polymer 230 is configured to expand in response to an adsorption of a vapor. For example, the adsorptive polymer 230 may expand in response to adsorbing water vapor, alcohol, volatile organic compounds (VOCs), and the like. The compound chosen to manufacture the adsorptive polymer 230 is selected based upon the particular desired vapor to detect. For example, the adsorptive polymer 230 may be poly(vinyl acetate) for sensing toluene, polyisoprene for sensing benzene, poly acrylic acid for sensing methanol and ethanol, and the like.

When the particular vapor is present, the adsorptive polymer 230 adsorbs the vapor and expands. The expansion of the adsorptive polymer 230 causes the cantilevered sensor electrode 215 to deflect laterally in a direction of the first electrode 205 by an amount Δx, decreasing a width of the gap 220, and increasing a width of the gap 225. Placement of the adsorptive polymer 230 on a side of the cantilevered sensor electrode 215 closer to the second electrode 210 causes the deflection toward the first electrode 205. However, in another embodiment, the adsorptive polymer 230 is placed on a side of the cantilevered sensor electrode 215 closer to the first electrode 205, which causes deflection toward the second electrode 210 in the presence of the particular vapor. In other words, the direction of the deflection of the cantilevered sensor electrode 215 is determined by the asymmetric placement of the adsorptive polymer 230 on the cantilevered sensor electrode 215.

The amount that the adsorptive polymer 230 expands depends upon the concentration of the vapor in the presence of the adsorptive polymer 230 when the adsorptive polymer 230 adsorbs the vapor. The higher the concentration of the vapor, the more the adsorptive polymer 230 adsorbs and expands, causing a larger deflection of the cantilevered sensor electrode 215. Similarly, as the concentration of the vapor decreases, the adsorptive polymer 230 is configured to contract in size, thus reducing the deflection of the cantilevered sensor electrode 215. The ability to expand and contract enables the capacitive vapor sensor 200 to be reusable.

When the cantilevered sensor electrode 215 deflects and changes the widths of the gaps 220 and 225, the capacitance changes between the first electrode 205 and the cantilevered sensor electrode 215 (i.e., of the first capacitor 120a) and between the second electrode 210 and the cantilevered sensor electrode 215 (i.e., of the second capacitor 120b).

FIG. 3 illustrates the capacitive vapor sensor 200 of FIG. 3 in combination with some of the circuit elements of the capacitive vapor sensor system 100 of FIG. 1 and an operational amplifier 250. The operational amplifier 250 may be included as part of the sensor 125 or the electronic processor 130, and assists in amplifying and sensing the current signal at the conductive base 240. In the embodiment of FIG. 3, the first and second DC voltage sources 115a-b are not provided and, accordingly, the DC bias voltage for the system 100 is set to zero. With no DC bias voltage, the lateral deflection ($\Delta x_0$) of the cantilevered sensor electrode 215 is characterized by the following equation.

$$\Delta x_0(C_g) = \frac{\alpha * \sigma_s(C_g)}{k_0}$$

where $\Delta x_0$ is the change in lateral deflection of the cantilevered sensor electrode 215 as a function of the concentration of the vapor $C_g$; $\sigma_s$ is the polymer swelling stress caused by the concentration of the vapor; and $k_0$ is the spring constant of the cantilevered sensor electrode 215. As the concentration of the vapor ($C_g$) increases, the adsorptive polymer 230 expands, causing stress to be applied to the cantilevered sensor electrode 215. Once the stress is larger than the spring constant ($k_0$), the cantilevered sensor electrode 215 begins to deflect in a direction of the first electrode 205. The deflection changes a first capacitance of the first electrode 205 and the cantilevered sensor electrode 215 and a second capacitance of the second electrode 210 and the cantilevered sensor electrode 215.

Figure 4:
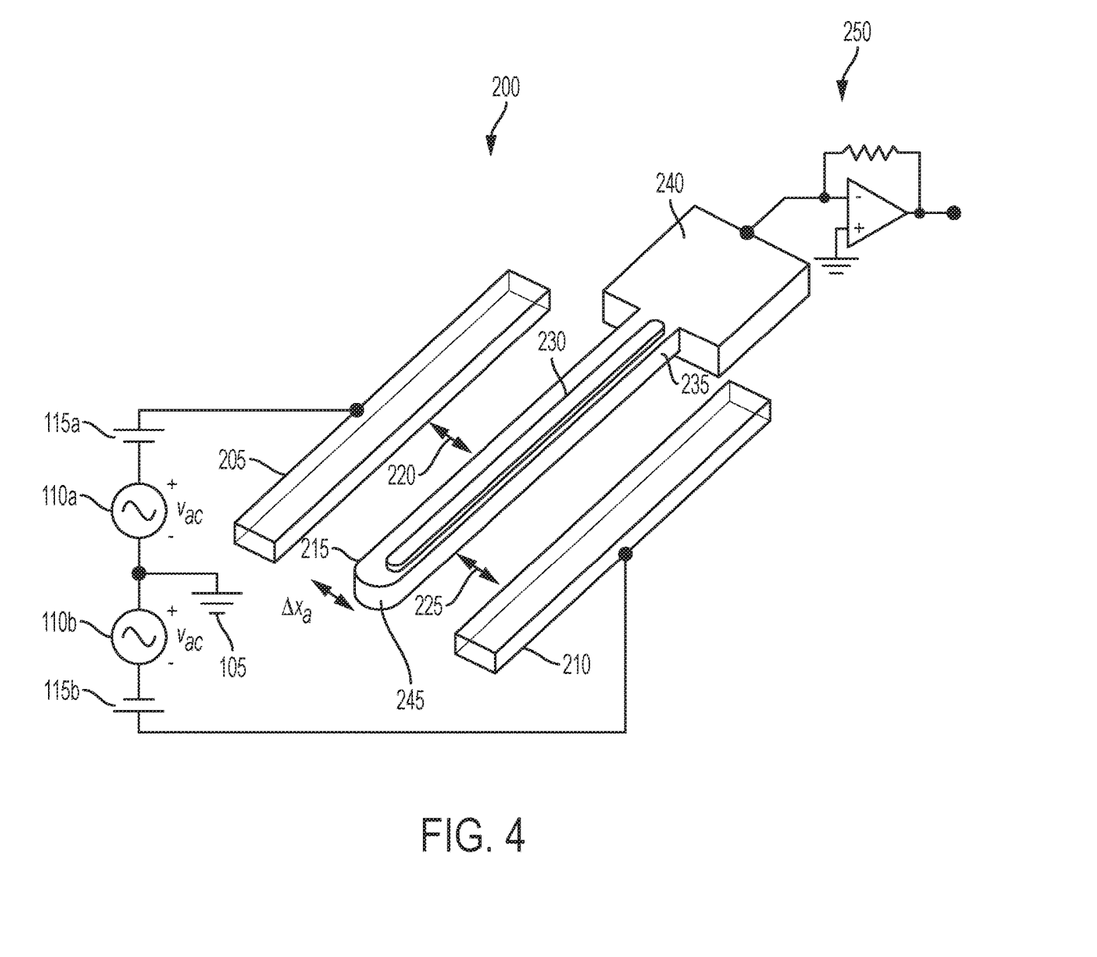
FIG. 4 illustrates a deflection of a cantilevered sensor electrode of the capacitive vapor sensor when a bias voltage is applied.

In FIG. 4, the first and second DC voltage sources 115a-b provide a DC bias voltage to the first electrode 205 and the second electrode 210, respectively, in addition to the first and second AC voltage sources 110a-b providing an AC voltage to the first electrode 205 and the second electrode 210. The deflection (Δx) of the cantilevered sensor electrode 215 is parametrically amplified by an application of a DC bias voltage. More particularly, when the DC bias voltage is applied to the first electrode 205 and the second electrode 210, the spring constant (k) of the cantilevered sensor electrode 215 is softened, and referred to as effective spring constant ($k_{eff}$). The effective spring constant ($k_{eff}$) of the cantilevered sensor electrode 215 is characterized by the following equation.

$$k_{eff}(V_B) = k_0 * \left(1 - \frac{V_B^2}{V_{PD}^2}\right) = \frac{k_0}{M}$$

where the effective spring constant $k_{eff}$ is a function of the DC bias voltage; $k_0$ is the original spring constant of the cantilevered sensor electrode 215;

$$\left(1 - \frac{V_B^2}{V_{PD}^2}\right)$$

is a spring softening factor, which depends upon a square of a ratio of the DC bias voltage (II) to a pull-in voltage ($V_{PD}^2$); and M is the magnification factor, and can be characterized as one over the spring softening factor. The pull-in voltage is a DC bias voltage that would be strong enough to pull the cantilevered sensor electrode 215 into contact with the first electrode 205 or the second electrode 210.

In some embodiments, if the cantilevered sensor electrode 215 contacts either the first electrode 205 or second electrode 210, a conductive connection is formed between the two electrodes and a change in capacitance can no longer be detected. Accordingly, the DC bias voltage is selected to be at a level that parametrically amplifies the deflection of the cantilevered sensor electrode 215, but without amplifying the deflection enough to cause contact between the first electrode 205 or the second electrode 210 and the cantilevered sensor electrode 215. However, setting the DC bias voltage near (or nearer) to the pull-in voltage enables large (or larger) magnification factors while maintaining accuracy and sensitivity of the capacitive vapor sensor 200.

With the DC bias voltage applied, the deflection of the cantilevered sensor electrode 215 is characterized by the following equation.

$$\Delta x_a(C_g, V_B) = \frac{\alpha * \sigma_s(C_g)}{k_{eff}(V_B)}$$

where $\Delta x_a$ is the amplified lateral deflection of the cantilevered sensor electrode 215 as a function of the concentration of the vapor ($C_g$) and the DC bias voltage ($V_B$). In this equation, $\sigma_s$ is a polymer swelling stress as a function of the concentration of the vapor, and $k_{eff}(V_B)$ is the effective spring constant of the cantilevered sensor electrode 215, calculated as discussed above.

Similar to the non-amplified deflection, as the concentration of the vapor increases, the adsorptive polymer 230 expands, causing stress to be applied to the cantilevered sensor electrode 215. Once the stress is larger than the effective spring constant (which is softened by the DC bias voltage), the cantilevered sensor electrode 215 begins to deflect toward the first electrode 205, changing a size of the gaps 220 and 225. The deflection changes a first capacitance of the first electrode 205 and the cantilevered sensor electrode 215 and a second capacitance of the second electrode 210 and the cantilevered sensor electrode 215.

Figure 5:
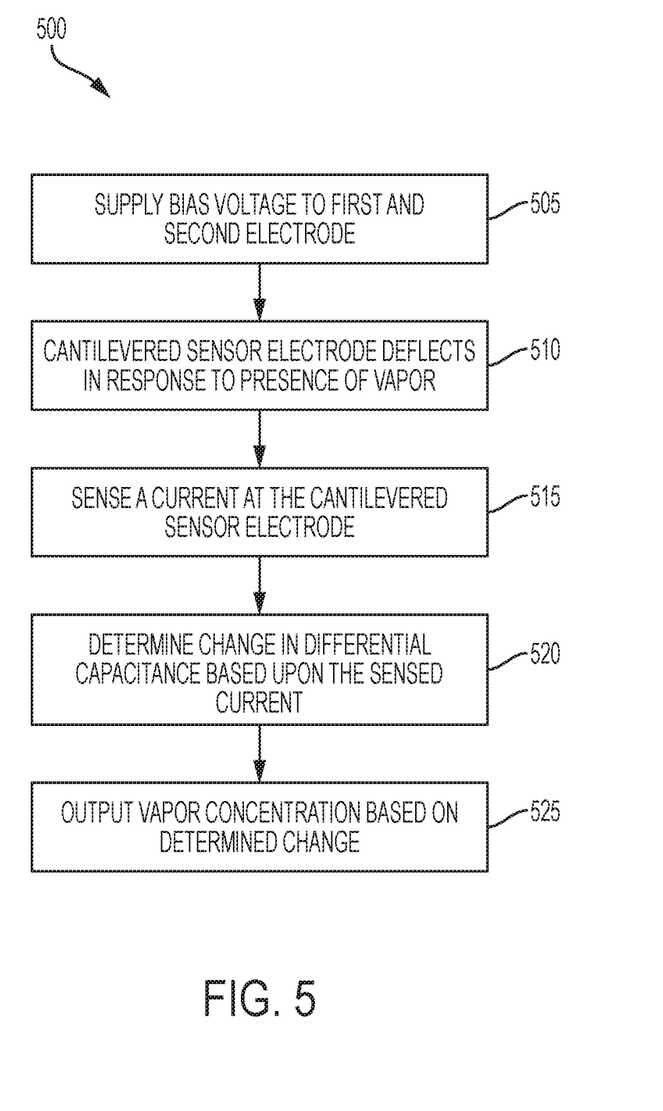
FIG. 5 illustrates a method for determining a vapor concentration according to one embodiment.

FIG. 5 illustrates a method 500 of determining a vapor concentration using the capacitive vapor sensor 200 in the capacitive vapor sensor system 100, according to one embodiment. In step 505, the bias voltage ($V_B$) is supplied to the first electrode 205 and the second electrode 210 as described above. In other words, the bias voltage is provided to the first electrode 205 and the second electrode 210 by the first and second DC voltage sources 115a-b, respectively. In some embodiments, the bias voltage is symmetric (i.e., approximately equal and opposite polarity) for the first electrode 205 and second electrode 210.

At step 510, the cantilevered sensor electrode 215 deflects in response to presence of a vapor. More particularly, when a particular vapor is present that is adsorbed by the adsorptive polymer 230, the adsorptive polymer 230 expands. The expansion of the adsorptive polymer 230 causes a change in a stress on the cantilevered sensor electrode 215, which causes the cantilevered sensor electrode 215 to deflect toward the first electrode 205 by the amplified lateral deflection ($\Delta x_a$). As described above with respect to FIG. 4, the deflection is parametrically amplified by the bias voltage supplied in step 505. Before the particular vapor is present (e.g., between steps 505 and 510), the cantilevered sensor electrode 215 is in an initial middle position (see FIG. 2).

In step 515, a current is sensed at the cantilevered sensor electrode 215. More particularly, the current is sensed by the sensor 125 at the shared node 127 (see FIG. 1), which is conductively coupled to the cantilevered sensor electrode 215 (e.g., via the conductive base 240). The amount of current being received at the cantilevered sensor electrode 215 is a function of the differential capacitance between the first electrode 205 and the second electrode 210. As the gaps 220 and 225 change in size (which changes the differential capacitance between the first electrode 205 and the second electrode 210), the amount of AC current induced at the cantilevered sensor electrode 215 changes. The electronic processor 130 receives a signal from the sensor 125 indicative of the sensed current.

At step 520, the electronic processor 130 determines the change in the differential capacitance between the first electrode 205 and the second electrode 210 based upon the sensed current. As discussed above with respect to FIGS. 1-4, the deflection of the cantilevered sensor electrode 215 causes a change in the differential capacitance between the first electrode 205 and the second electrode 210. More particularly, the deflection of the cantilevered sensor electrode 215 causes the gaps 220 and 225 to change in size, causing a first capacitance value between the first electrode 205 and the cantilevered sensor electrode 215 to change and causing a second capacitance value between the second electrode 210 and the cantilevered sensor electrode 215 to change. The difference between the first and second capacitance is the differential capacitance between the first electrode 205 and the second electrode 210.

In step 525, the electronic processor 130 outputs a vapor characteristic, such as concentration, based on the detected change in differential capacitance. The change in differential capacitance indicates the concentration of vapor in the presence of the capacitive vapor sensor 200. Accordingly, in some embodiments, the electronic processor 130 determines the vapor concentration by accessing a lookup table that maps differential capacitance values to vapor concentrations. Thereafter, the electronic processor 130 outputs the vapor concentration by, for example, the electronic processor 130 storing the vapor concentration in the memory 140, displaying the vapor concentration on the display 145, providing an audible indication of the vapor concentration (e.g., an alarm), or transmitting the vapor concentration to another computer device (e.g., directly or indirectly via a wired or wireless network connection). The concentration may take the form of one or more of a particular quantity (e.g., in parts per million (ppm)), a percentage, a binary indication (e.g., vapor present or not present), a range characterization (e.g., low, medium, high; or, normal and high) that may be defined by thresholds, or another form.

Figure 6A:
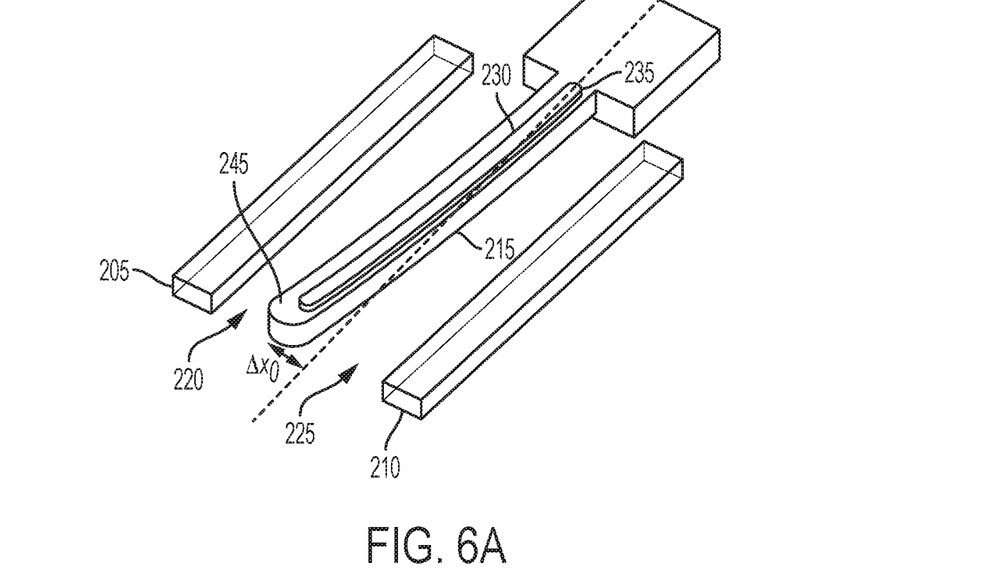
FIG. 6A illustrates a deflection of the capacitive vapor sensor with no bias voltage applied.
Figure 6B:
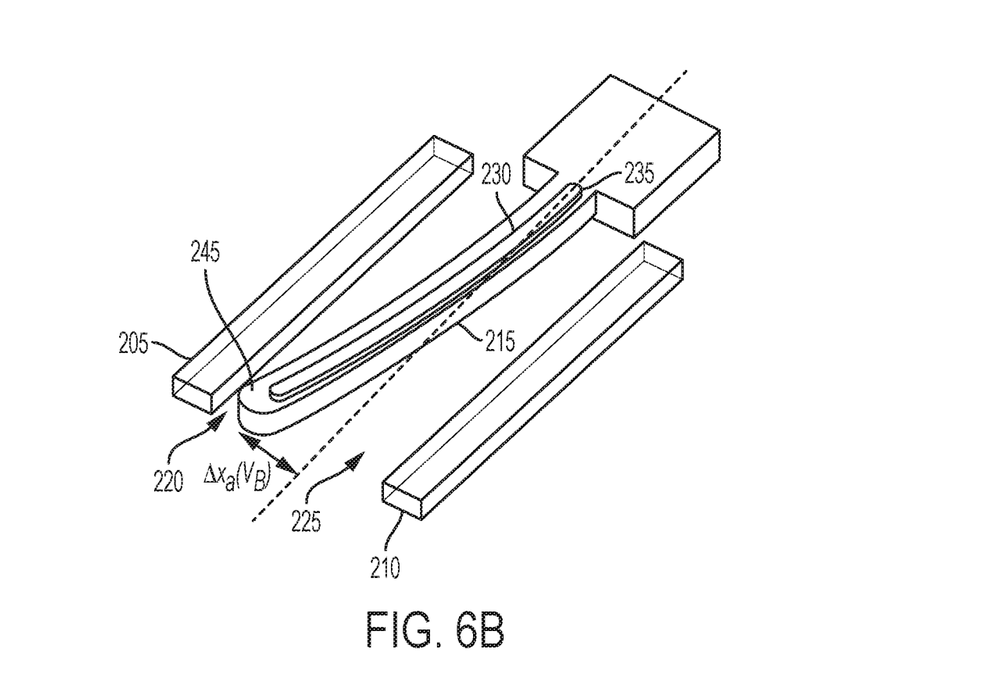
FIG. 6B illustrates a deflection of the capacitive vapor sensor with bias voltage applied.

FIG. 6A and FIG. 6B show a comparative difference of the deflection of the cantilevered sensor electrode 215 dependent on whether the DC bias voltage is applied. FIG. 6A illustrates the deflection of the cantilevered sensor electrode 215 when no DC bias voltage is applied. FIG. 6B illustrates the deflection of the cantilevered sensor electrode 215 when an absolute value of the DC bias voltage is greater than 0. As shown, the application of the DC bias voltage amplifies the deflection of the cantilevered sensor electrode 215. The parametric amplification of the deflection allows for more sensitive detection of vapors, as the cantilevered sensor electrode 215 deflects more when parametrically amplified by the DC bias voltage than without the DC bias voltage when the same concentration of the vapor is present.

Figure 7:
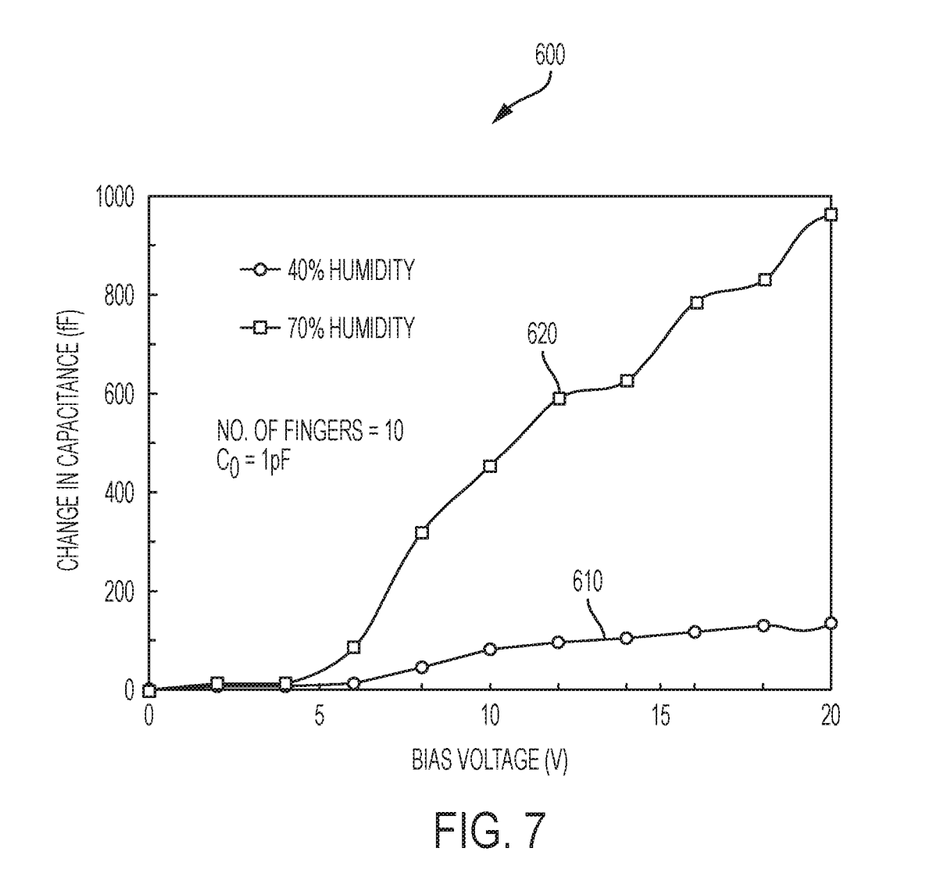
FIG. 7 illustrates a graph showing an application of different levels of bias voltage to a capacitive vapor sensor and an associated change in capacitance.

FIG. 7 illustrates a graph 600 of an application of different levels of DC bias voltage to the first electrode 205 and the second electrode 210 of the capacitive vapor sensor 200 according to one embodiment. In this example embodiment, the adsorptive polymer 230 is configured to expand in the presence of water vapor. The graph 600 includes a low humidity curve 610 and a high humidity curve 620. As the DC bias voltage increases, the change in capacitance for a same level of humidity (i.e., the low humidity curve 610 is at 40% humidity and the high humidity curve 620 is at 70% humidity) becomes larger, and is, therefore, more easily detected. Accordingly, with the application of DC bias voltage, the capacitive vapor sensor 200 is more sensitive to changes in a level of humidity.

Figure 8:
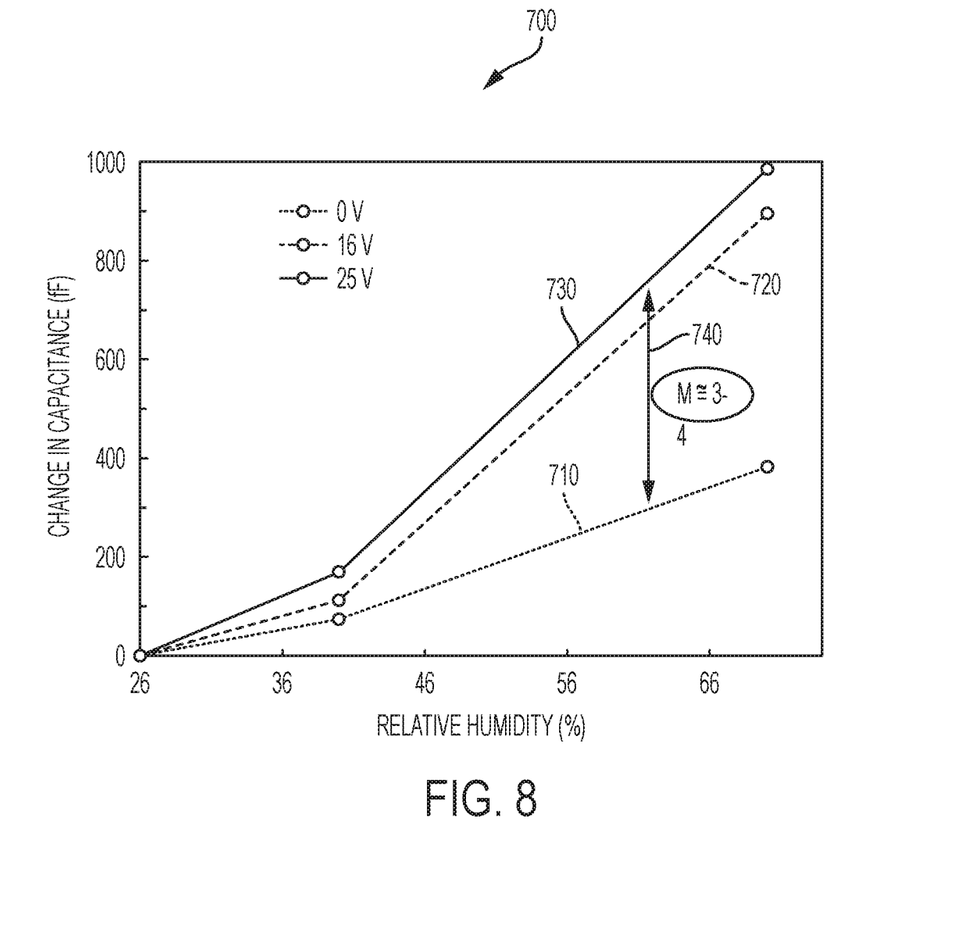
FIG. 8 illustrates a graph showing a magnification of a change in capacitance based upon a bias voltage applied to a capacitive vapor sensor.

FIG. 8 illustrates a graph 700 that shows a magnification of a change in capacitance based upon a DC bias voltage applied to a capacitive vapor sensor 200 over various humidity levels. The graph 700 includes a zero DC bias curve 710, a sixteen volt DC bias curve 720, and a twenty-five volt DC bias curve 730. The graph 700 shows that, as the relative humidity increases, the change in capacitance increases for each of the three curves. However, as more DC bias voltage is used, the change in capacitance is increased, for example, by a magnification factor 740 of approximately three of four for curve 730 relative to curve 710.

Figure 9:
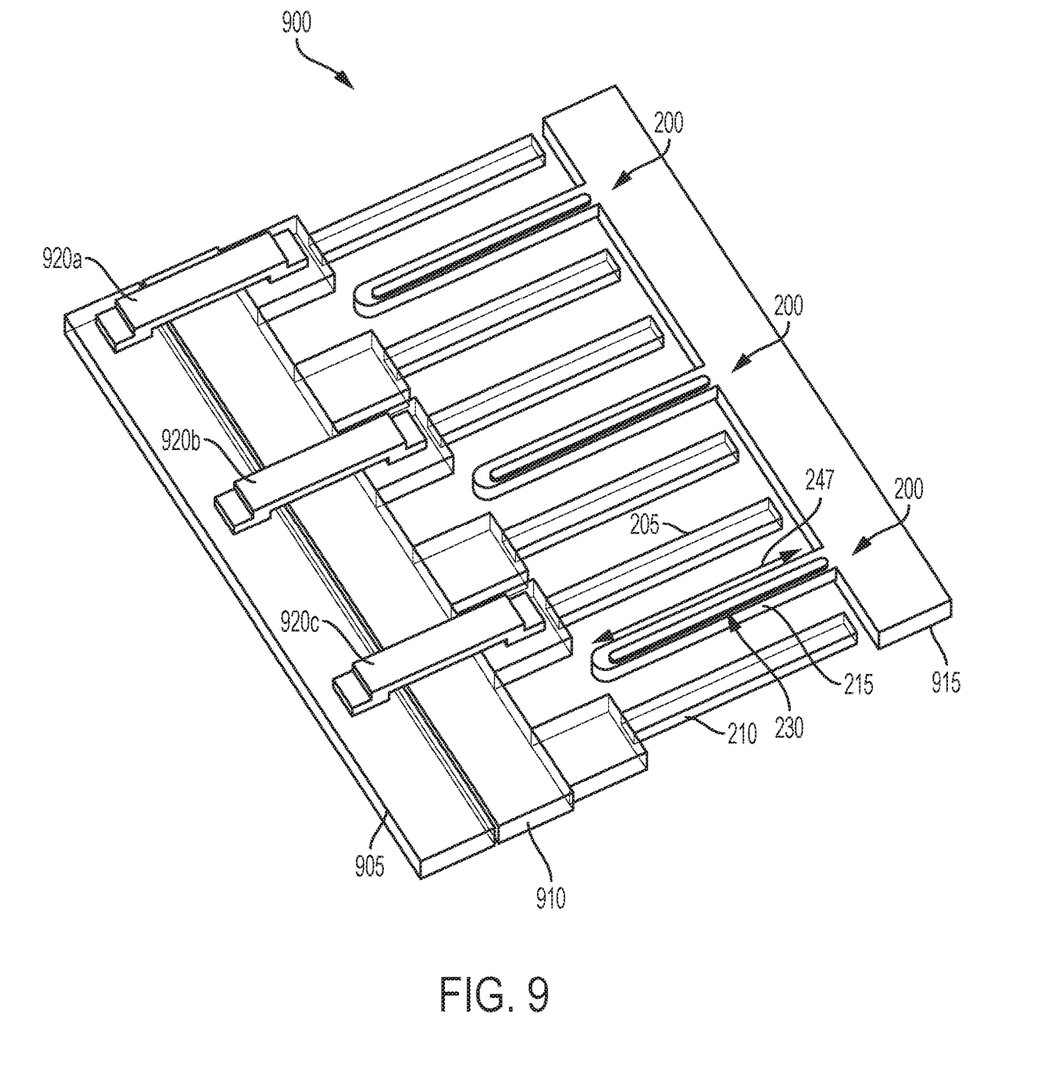
FIG. 9 illustrates an array of capacitive vapor sensors according to one embodiment.

FIG. 9 illustrates a sensor array 900 of capacitive vapor sensors 200, which are individually labeled capacitive vapor sensors 200*a-c*, according to one embodiment. In some embodiments, the sensor array 900 is inserted into the system 100 of FIG. 1 in place of the capacitive vapor sensor 200, is used in the method 500 (FIG. 5) to determine a vapor concentration in place of the capacitive vapor sensor 200, or both. As described in further detail below, the sensor array 900 has the same electrical input and output nodes as the capacitive vapor sensor 200, enabling insertion of the sensor array 900 into the system 100 of FIG. 1.

In the sensor array 900, the capacitive vapor sensors 200*a-c* are ganged in parallel. The first electrode 205 of each of the capacitive vapor sensors 200*a-c* is coupled to a first electrode rail 905. While not shown, the first electrode rail 905 is coupled to the first AC voltage source 110*a* and the first DC voltage source 115*a* (see FIG. 1) to provide the same AC current and the same DC bias voltage to each of the first electrodes 205 of the capacitive vapor sensors 200*a-c*. The first electrode 205 of each of the capacitive vapor sensors 200*a-c* is connected to the first electrode rail 905 by jumpers 920*a-c*, respectively The second electrode 210 of each of the capacitive vapor sensors 200*a-c* is coupled to a second electrode rail 910 in the sensor array 900. The second electrode rail 910 can be coupled to the second AC voltage source 110*b* and the first DC voltage source 115*b* (see FIG. 1) to provide the same AC current and the same DC bias voltage to each of the second electrodes 210 of the capacitive vapor sensors 200*a-c*.

By utilizing jumpers 920*a-c*, the first electrode rail 905 and the second electrode rail 910 can be placed on the same side of the sensor array 900, which prevents interference from the first electrode rail 905 and the second electrode rail 910 with the cantilevered sensor electrode rail 915. The jumpers 920*a-c* are fabricated out of a conductive material, and may be further insulated so the second electrode rail 910 does not interfere with the jumpers 920*a-c*.

The cantilevered sensor electrode 215 of each of the capacitive vapor sensors 200*a-c* has the same adsorptive polymer 230 applied thereto and is coupled to a cantilevered sensor electrode rail 915 in the sensor array 900. The combined current at the cantilevered sensor electrode rail 915, which is a shared node, is sensed by the sensor 125. The electronic processor 130 receives a signal from the sensor 125 indicative of the combined current at the cantilevered sensor electrode rail 915 (see step 515 above). The electronic processor 130 then determines the change in the differential capacitance between the first electrodes 205 and the second electrodes 210 based upon the sensed combined current (see step 520 above). The electronic processor 130 then outputs a vapor concentration based on the detected change in differential capacitance (see step 525 above). With each additional capacitive vapor sensors 200*a-c* ganged in parallel in the sensor array 900, the combined current signal caused by the deflection of the various cantilevered sensor electrodes 215 increases, providing a higher total output signal than a single capacitive vapor sensor, and resulting in a more sensitive vapor sensor with higher tolerances and improved noise floor. The additional capacitive vapor sensors 200 may also provide redundancy to alleviate issues that may results in the event of anomalies in individual sensors 200 of the sensor array 900 in the field or during manufacture.

While the sensor array 900 is described with respect to three capacitive vapor sensors 200*a-c*, in some embodiments, the sensor array 900 includes two or more than three capacitive vapor sensors 200 ganged in parallel.

In some embodiments, each of the capacitive vapor sensors 200*a-c* is connected individually to the electronic processor 130 through its own cantilevered sensor electrode 215, and each cantilevered sensor electrode 215 includes a different adsorptive polymer 230 configured to adsorb a different vapor. Accordingly, in these embodiments, the electronic processor 130, with the sensor array 900, is configured to determine the presence and concentration of a plurality of vapors, one vapor for each connected cantilevered sensor electrode 215 having a different type of adsorptive polymer 230.

In still further embodiments, an electronic processor 130 is coupled to a plurality of sensor arrays 900, with each sensor array 900 having capacitive vapor sensors 200 with the same adsorptive polymer 230. The plurality of sensor arrays 900 may share a support surface such that a single sensor device includes the plurality of sensor arrays 900. In these embodiments, the electronic processor 130, with the different sensor arrays 900, is configured to determine the presence and concentration of a plurality of vapors, one vapor for each sensor array 900 having a different type of adsorptive polymer 230.

In some embodiments, a housing is provided that contains the components of the system 100, including the capacitive vapor sensor 200 or sensor array 900, and a power source (e.g., a battery pack or corded-power supply) to provide a hand-held sensing device. The display 145 may be provided on an exterior surface of the housing to enable read outs of vapor concentrations calculated by the system 100. Further input devices (e.g., hard keys on the housing or soft keys on a touch screen used as the display 145) may be provided and coupled to the electronic processor 130 to enable a user to navigate various graphical user interfaces to control the sampling of vapors and display of vapor concentrations.

Various features and advantages of some embodiments are set forth in the following claims.

What is claimed is:

1. A capacitive vapor sensor comprising
   a first electrode and a second electrode, the first and second electrodes configured to provide a bias voltage;
   a cantilevered sensor electrode interdigitated between the first and second electrodes; and
   an adsorptive polymer attached to a surface of the cantilevered sensor electrode configured to expand in response to adsorbing a vapor and cause a deflection of the cantilevered sensor electrode, the deflection causing a change in a differential capacitance of the first and second electrodes.

2. The capacitive vapor sensor of claim 1, wherein the differential capacitance of the first and second electrodes is a difference between a first capacitance of the first electrode and the cantilevered sensor electrode and a second capacitance of the second electrode and the cantilevered sensor electrode.

3. The capacitive vapor sensor of claim 1, wherein the bias voltage is a DC voltage that is symmetric.

4. The capacitive vapor sensor of claim 1, wherein the bias voltage parametrically amplifies the deflection of the cantilevered sensor electrode.

5. The capacitive vapor sensor of claim 1, wherein the adsorptive polymer is asymmetrically applied to the surface of the cantilevered sensor electrode.

6. The capacitive vapor sensor of claim 1, wherein an amount that the adsorptive polymer expands is dependent upon a concentration of the vapor present.

7. The capacitive vapor sensor of claim 1, wherein the cantilevered sensor electrode has an effective spring constant that is softened by the bias voltage such that the effective spring constant of the cantilevered sensor electrode at a first bias voltage level is less than the effective spring constant of the cantilevered sensor electrode at a second bias voltage level that is lower than the first bias voltage level.

8. The capacitive vapor sensor of claim 1, wherein the capacitive vapor sensor is further coupled to a current sensor and an electronic processor,
   the current sensor being coupled to the cantilevered sensor electrode and configured to indicate current at the cantilevered sensor electrode, and
   the electronic processor being coupled to the sensor and configured to determine the change in the differential capacitance to determine a characteristic of the vapor.

9. The capacitive vapor sensor of claim 1, wherein the capacitive vapor sensor is coupled in parallel with a plurality of capacitive vapor sensors to form a sensor array.

10. A method for determining a vapor concentration, the method comprising
    supplying a bias voltage to a first electrode and a second electrode;
    deflecting, by a cantilevered sensor electrode, in response to an adsorption of a vapor by an adsorptive polymer attached to a surface of the cantilevered sensor electrode, wherein the adsorptive polymer is configured to expand in response to the adsorbing of the vapor, the deflection causing a change in a differential capacitance of the first and second electrodes;
    sensing a current at the cantilevered sensor electrode;
    determining, by an electronic processor, the change in the differential capacitance based on the current sensed; and
    outputting, by the electronic processor, a vapor concentration of the vapor based on the change in the differential capacitance.

11. The method of claim 10, wherein the differential capacitance of the first and second electrodes is a difference between a first capacitance of the first electrode and the cantilevered sensor electrode and a second capacitance of the second electrode and the cantilevered sensor electrode.

12. The method of claim 10, wherein the adsorptive polymer is asymmetrically applied to the surface of the cantilevered sensor electrode.

13. The method of claim 10, wherein an amount that the adsorptive polymer expands is dependent upon the vapor concentration of the vapor.

14. The method of claim 10, wherein the cantilevered sensor electrode has an effective spring constant, and wherein supplying the bias voltage to the first electrode and the second electrode softens the effective spring constant.

15. The method of claim 10, further comprising:
    supplying a bias voltage to a third electrode and a fourth electrode, wherein the third electrode is coupled to the first electrode, and the fourth electrode is coupled to the second electrode; and
    deflecting, by a second cantilevered sensor electrode, in response to an adsorption of the vapor by a second adsorptive polymer attached to a surface of the second cantilevered sensor electrode, wherein the adsorptive polymer is configured to expand in response to the adsorbing of the vapor and the second cantilevered sensor electrode is coupled to the cantilevered sensor electrode, the deflection causing a change in a differential capacitance of the first and second electrodes, wherein
    the current at the cantilevered sensor electrode is a combined current including current induced in both the cantilevered sensor electrode and the second cantilevered sensor electrode,
    the change in the differential capacitance is based on the combined current.

16. A capacitive vapor sensor system, the system comprising:
    a capacitive vapor sensor including:
        a first electrode and a second electrode, the first and second electrodes configured to provide a bias voltage,
        a cantilevered sensor electrode interdigitated between the first and second electrodes, and
        an adsorptive polymer attached to a surface of the cantilevered sensor electrode configured to expand in response to adsorbing a vapor and cause a deflection of the cantilevered sensor electrode, the deflection causing a change in a differential capacitance of the first and second electrodes;
    a sensor coupled to the cantilevered sensor electrode and configured to indicate current at the cantilevered sensor electrode; and an electronic processor coupled to the sensor and configured to determine the change in the differential capacitance to determine a characteristic of the vapor.

17. The system of claim 16, further comprising:

a second capacitive vapor sensor including:
- a third electrode and a fourth electrode, the third and fourth electrodes configured to provide a bias voltage,
- a second cantilevered sensor electrode interdigitated between the third and fourth electrodes, and
- a second adsorptive polymer attached to a surface of the second cantilevered sensor electrode configured to expand in response to adsorbing a vapor and cause a deflection of the second cantilevered sensor electrode, the deflection causing a change in a differential capacitance of the third and fourth electrodes.

18. The system of claim 17, wherein the sensor is further coupled to the second cantilevered sensor electrode and configured to indicate current at the second cantilevered sensor electrode.

19. The system of claim 17, wherein the capacitive vapor sensor and the second capacitive vapor sensor are ganged in parallel to form a sensor array.

20. The system of claim 16, wherein the cantilevered sensor electrode has an effective spring constant that is softened by the bias voltage such that the effective spring constant of the cantilevered sensor electrode at a first bias voltage level is less than the effective spring constant of the cantilevered sensor electrode at a second bias voltage level that is lower than the first bias voltage level.

* * * * *